United States Patent [19]

Satzler

[11] Patent Number: 4,490,316

[45] Date of Patent: Dec. 25, 1984

[54] APPARATUS AND METHOD FOR CONTROLLING INTERNAL SIZE OF AN EXTRUDED HOSE

[75] Inventor: Ronald L. Satzler, Princeville, Ill.

[73] Assignee: Caterpillar Tractor Co., Peoria, Ill.

[21] Appl. No.: 508,998

[22] Filed: Jun. 29, 1983

[51] Int. Cl.³ .................. B29D 23/04; B29D 23/05; B65H 81/00

[52] U.S. Cl. .................. 264/40.7; 73/37.9; 156/393; 264/103; 264/173; 264/209.1; 425/113; 425/133.1; 425/140

[58] Field of Search ............... 156/149, 393, 360, 378, 156/384, 387; 264/40.1, 40.7, 40.5, 103, 173, 209.1, 209.4, 209.5; 425/140, 133.1, 113; 364/469, 473, 563, 565; 73/37.9

[56] References Cited

U.S. PATENT DOCUMENTS

| Re. 29,886 | 1/1979 | Dembiak et al. | 364/469 |
|---|---|---|---|
| 2,501,690 | 3/1950 | Prendergast | 425/133.1 |
| 2,750,792 | 6/1956 | Morton et al. | 73/37.6 |
| 3,678,271 | 7/1972 | Groezinger | 250/71.5 R |
| 3,856,595 | 12/1974 | Skobel | 156/64 |
| 4,137,025 | 1/1979 | Graves et al. | 425/71 |
| 4,137,028 | 1/1979 | Reitemeyer et al. | 425/141 |
| 4,161,379 | 7/1979 | Sudyk | 425/112 |
| 4,171,193 | 10/1979 | Rahlfs | 425/140 |
| 4,202,718 | 5/1980 | Mizutani et al. | 156/171 |
| 4,367,646 | 1/1983 | Allen et al. | 73/37.9 |

OTHER PUBLICATIONS

Karg Braiders-Advertising Brochure.
Tool and Manufacturing Handbook, (Third Edition), Copyright-1976.

Primary Examiner—Michael W. Ball
Attorney, Agent, or Firm—J. W. Burrows

[57] ABSTRACT

An apparatus and method is provided for continuously extruding an elastomeric hose (10) having a controlled internal size. A controlled internal size is necessary in order to mount various types of couplings to the hose. Other hose making processes require extruding the hose on a mandrel in order to control the internal size. The use of mandrels restrict hose length and require additional floor space due to the lengthy mandrels. An extruded hose (10) having a controlled internal size is continuously made by extruding an elastomeric material over a first end portion (104) of an internal shaping member (102) and continuously monitoring the flow of air between a gauge member (112) and the internal size of the hose (10). The rate of extrusion is controlled in response to the flow of air between the gauge member (112) and the internal size of the hose (10) changing from a predetermined range. The continuous monitoring of the internal size adjacent the internal shaping member and adjusting the rate of extrusion in response thereto produces a continuous hose with a controlled internal size without the use of long mandrels.

18 Claims, 2 Drawing Figures

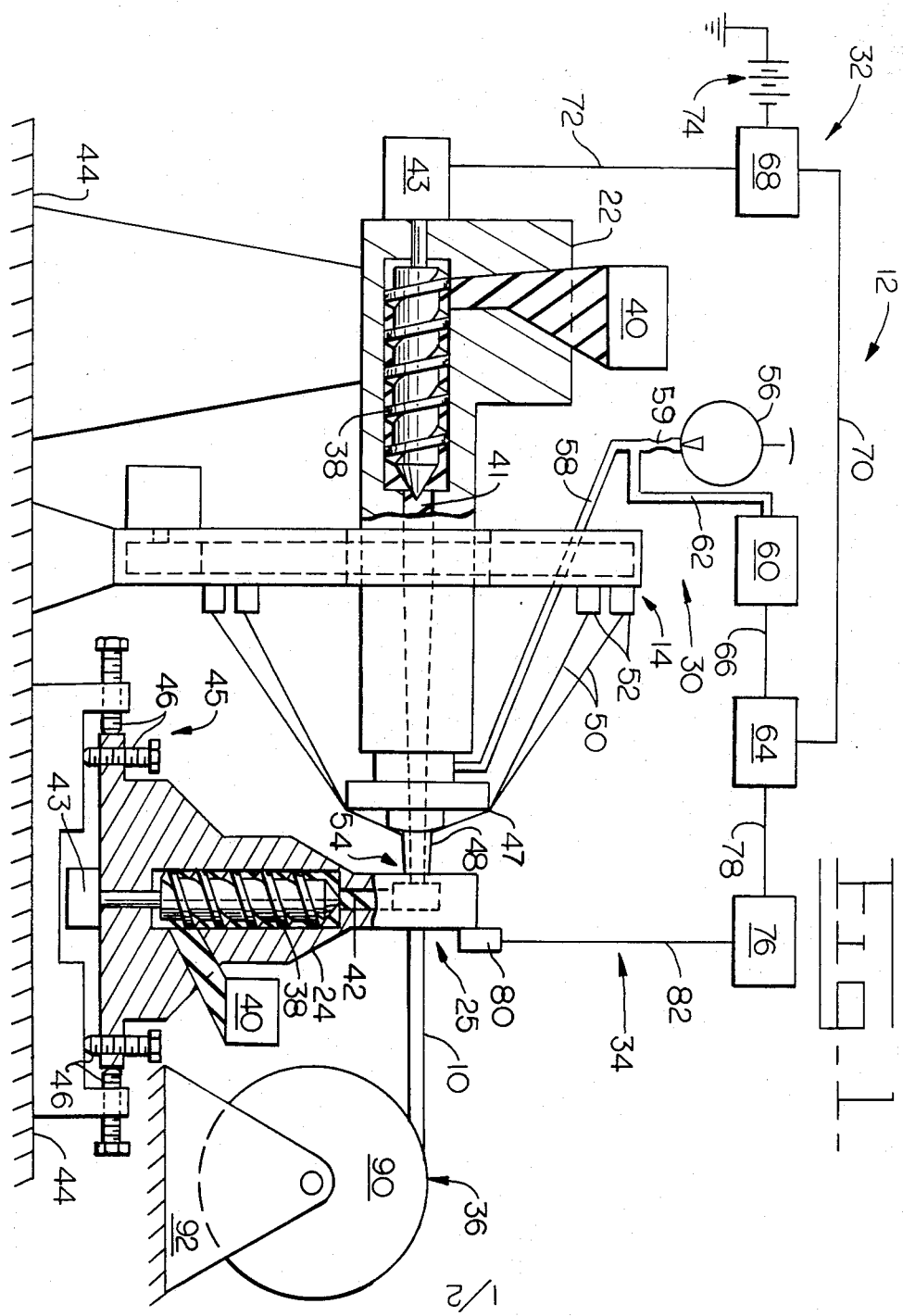

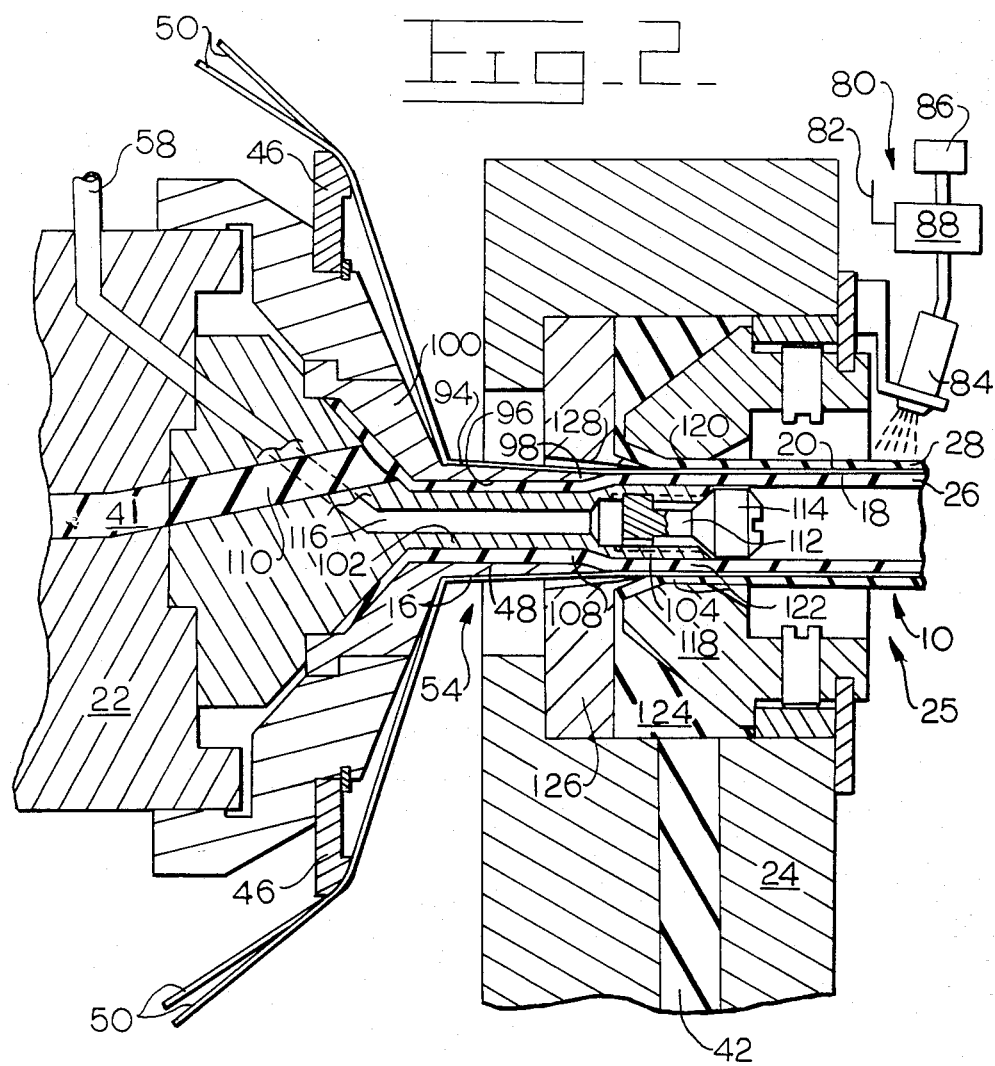

4,490,316

APPARATUS AND METHOD FOR CONTROLLING INTERNAL SIZE OF AN EXTRUDED HOSE

DESCRIPTION

1. Technical Field

This invention relates generally to the manufacturing of an extruded hose and more particularly to the apparatus and method for controlling the internal size of the extruded hose.

2. Background Art

In order to mount some couplings onto the ends of an extruder hose, it is necessary to control the internal size of the hose within a predetermined size range. In some processes, extruded hoses are extruded onto a mandrel in order to control the internal size while in other processes there is no provisions for continuously checking and maintaining a critical internal size. One of the problems associated with using a mandrel is that the overall length of the hose is dependent on the length of the mandrel. Consequently, it is not practical to produce a long extruded hose having a controlled internal size. There are processes taught in the art that produce extruded hose on a continuous basis but make no provision to continuously monitor and maintain a critical internal size.

The present invention is directed to overcoming one or more of the problems as set forth above.

DISCLOSURE OF THE INVENTION

In one aspect of the present invention an apparatus is provided for controlling the internal size of an extruded elastomeric member. The apparatus includes an extruder and a die having internal and external forming members for forming the extruded member. A means continuously monitors the internal size of the extruding member and controls the rate of extrusion in response to a change of the internal size from a predetermined size range.

In another aspect of the present invention a method is provided for manufacturing an elastomeric hose. An elastomeric hose having a predetermined internal size is extruded while the internal size is continuously monitored. The rate of extrusion is controlled in response to a change of the internal size from a predetermined size range.

The present invention solves the problem of continuously producing an extruded hose having a predetermined internal size without having to use long mandrels by continuously monitoring the internal size of the extruded hose and varying the rate of extrusion in response to a change in the internal size from some predetermined size range.

BRIEF DESCRIPTION OF THE DRAWINGS

FIG. 1 is a diagrammatic illustration of an apparatus of an embodiment of the present invention; and FIG. 2 is a somewhat enlarged partial sectional view of a portion of the apparatus of FIG. 1 and illustrating components in more detail.

BEST MODE FOR CARRYING OUT THE INVENTION

Referring now to FIGS. 1 and 2 of the drawings, an apparatus for continuously forming a flexible reinforced hose 10 having a controlled internal size is generally indicated by the reference numeral 12. The apparatus 12 includes a conventional braid forming machine 14 which continuously produces a tubular braided reinforcement member 16 having inner and outer surfaces 18,20, first and second extruders 22,24 and a die mechanism 25 for forming a liner and cover 26,28 from elastomeric material, such as rubber, onto the reinforcement member 16, means 30 for continuously monitoring the internal size of the extruded hose 10, control means 32 for controlling the speed of the extruder 22 in response to a change of the internal size of the hose 10 from a predetermined size range, means 34 for marking a portion of the cover 28 to indicate that the internal portion is outside of the predetermined size range, and a take-up mechanism 36 for storing the extruded hose 10 for subsequent curing.

Each of the extruders 22,24 includes an extruder screw 38 and a hopper 40 for supplying the elastomeric materials to the die mechanism 25. A pair of passages 41,42, respectively connect the extruder screw 38 of each extruder 22,24 to the die mechanism 25 and an electric motor 43 drives each of the extruder screws 38. The second extruder 24 is adjustably mounted on a base 44 by an adjustment mechanism 45. The adjustment mechanism 45 provides both radial and axial adjustment of the second extruder 24 relative to the portion of the die mechanism 25 that is connected to the first extruder 22. The adjustment mechanism 45, as diagrammatically shown, includes a plurality of adjustment screws 46 positioned around the base of the second extruder 24 and the portion of the base 44 that receives the base of the second extruder 24. It should be recognized that other types of mechanisms could be used to adjust the mounting position of the second extruder 24 without departing from the essence of the invention.

The braiding machine 14 includes a guide ring 47 and a mandrel 48 on which the reinforcement member 16 is formed. A plurality of elongated strands 50 (only a portion of which are shown), such as strands of metallic wire are drawn from a plurality of bobbins 52 carried on rotating spindles on the braiding machine 14 and are directed in a predetermined pattern by the braiding machine across the guide ring 47 onto the mandrel 48. Half of the plurality of bobbins 52 are rotating in an opposite direction relative to the other half so that the strands 50 are spirally wrapped on the mandrel 48 in an alternating overlapping interwoven relationship to continuously produce the braided tubular member 16. The braided tubular member 16 has a continuous circumferential surface and is made in a continuous linear length. Preferably, the strands 50 are positioned in abutting relationship with one another to form a close knit braid which has a total initial coverage on the mandrel 48 allowing substantially no openings therebetween.

The monitoring means 30 includes a fluid gauge means 54 for monitoring the internal size of the extruded hose 10, an external source of fluid pressure, such as an air pump 56, and a conduit 58 having an orifice 59 located therein connects the air pump 56 with the fluid gauge means 54.

The control means 32 includes a pressure transducer 60 connected to the external source 56 of fluid pressure downstream of the orifice 59 by a conduit 62, a signal conditioner 64 connected to the pressure transducer by an electrical line 66, and a motor control 68 connected to the signal conditioner 64 by an electrical line 70 and to the motor 43 of the first extruder by an electrical line 72. A source 74 of electrical energy is connected to the motor control 68 for providing a source of electrical energy for the system.

The marking means 34 includes a marker actuator control 76 connected to the signal conditioner 64 by an electrical line 78, and a marking device 80 mounted on the second extruder 24 and connected to the marker actuator control 76 by an electrical line 82. The marking device 80 could be a printing device or a device to scribe a line on the hose or as shown more specifically in FIG. 2, a spray nozzle 84 mounted on the second extruder 24 and having a source of fluid paint 86 and an electrically controlled module 88 for opening and closing the flow of paint to the spray nozzle 84.

The take-up mechanism 36 includes a take-up reel 90 mounted on a trunnion 92.

Referring more specifically to FIG. 2, the mandrel 48 includes a tapered outer surface 94 and a bore 96. The mandrel 48 has a first end portion 98 terminating in the die mechanism 25 and has a second end portion 100 connected to the first extruder 22.

The die mechanism 25 includes an internal shaping member 102. The internal shaping member 102 extends through the bore 96 of the mandrel 48 and has a first end portion 104 extending beyond the first end portion 98 of the mandrel 48 and has a second end portion 106 which is connected to the first extruder 22. A cavity 108 is defined between the bore 96 of the mandrel 48 and the internal shaping member 102. The cavity 108 is connected to the passage 41 through a port 110 located in the second end portion 106 of the internal shaping member 102.

The fluid gauge means 54 includes a gauging member 112 mounted to the first end portion 104 of the internal shaping member 102. A portion 114 of the gauging member 112 extends beyond the first end portion 104 of the internal shaping member 102. The portion 114 has a cross-sectional area less than the cross-sectional area of the first end portion 104 which defines a predetermined orifice size between the portion 114 and the optimum internal size of the extruded hose 10. A passage 116 located in the internal shaping member freely connects the predetermined orifice to the conduit 58.

The die mechanism 25 further includes an external shaping member 118 located on the second extruder 24. The external shaping member 118 is adjustably positioned on the second extruder 24 by a plurality of screws 119. The external shaping member 118 has an inside portion 120 at one end which is radially disposed about the first end portion 104 of the internal shaping member 102. An annular space 122 is defined between the first end portion 104 of the internal shaping member 102, the inside portion 120 of the external shaping member 118, and the first end portion 98 of the mandrel 48. A chamber 124 connects the annular space 122 with the passage 42 of the second extruder 24. The chamber 124 is formed by the one end of the external shaping member 118 and a guide collar 126. An internal portion 128 of the guide collar 126 is radially disposed about a portion of the first end portion 104 of the internal shaping member 102.

INDUSTRIAL APPLICABILITY

In the use of the apparatus 12, the braiding machine 14 braids the strands of wire 50 onto the mandrel 48 to continuously form the reinforcement member 16. The mandrel 48 is preferably a tapered mandrel and the braiding of the strands 50 onto the larger end of the tapered surface 94 results in the closely knit braid which allows substantially no openings therebetween. The action of the strands 50 being laid adjacent to one another plus the lead of the strands being laid onto the mandrel 48 results in the reinforcement member 16 being progressively pushed towards the smaller end of the tapered surface 94 as a result of the braiding function. As the braided reinforcement member 16 leaves the first end portion 104 of the mandrel 48 and enters the annular space 122, the liner 26 is extruded onto the inner surface 18 of the reinforcement member 16. This is accomplished by the elastomeric material being extruded into the annular space 122 just beyond the first end portion 98 of the mandrel 48 through the passage 41, port 110 and cavity 108. The first end portion 104 of the internal shaping member 102 forms the internal surface of the liner 26 while the outer portion of the liner 26 is formed by the inner surface 18 of the reinforcement member 16.

At approximately the same axial location the cover 28 is formed over the reinforcement member 16 by the elastomeric material being extruded into the annular space 122 from the second extruder 24 through the passage 42 and the chamber 124. By having the braided member 16 formed on the mandrel 48 and being continuously forced off of the mandrel 48 at a rate dependent on the braiding speed, the extrusion of the liner 26 and cover 28 is completed very close to the first end portion 98 of the mandrel 48. This compactness of operations minimizes floor space thus reducing overall cost while continuously producing a reinforced hose 10 having a braided reinforcement member 16 with a continuous circumferential surface.

The concentricity of the liner 26 and cover 28 with the braided member 16, is maintained by controlling the relationship of the external shaping member 118 and the guide collar 126 relative to the first end portion 104 of the internal shaping member 102 and the mandrel 48. Since the external shaping member 118 and the guide collar 126 are mounted on the second extruder 24, the adjustment mechanism 45 can simultaneously adjust the external shaping member 118 and guide collar 126 in all directions. Furthermore the plurality of screws 119 can radially adjust the external shaping member 118 relative to the guide collar 126.

The internal size of the hose 10 is continuously controlled by the fluid gauge means 54 providing a signal to the control means 32 so that the rate of extrusion is changed in response to the internal size of the hose exceeding a predetermined size range. The signal to the control means 32 is established by producing a volume of air and monitoring the flow and/or pressure of the air being directed across the predetermined orifice. As shown in this concept a pressure regulating apparatus is being utilized. The air pump 56 produces the volume of air which flows across the orifice 59 through conduit 58 and passage 116 to the predetermined orifice that is established between the portion 114 of the gauging member 112 and inside portion of the liner 26. With the predetermined orifice size, a predetermined amount to air passes thereacross. The restriction made by the orifice establishes a pressure signal in the conduit 58. This signal which is representative of the internal size of the hose 10 is communicated to the pressure transducer 60 through the conduit 62. The pressure transducer 60 translates the pressure signal into an electrical signal and directs the resulting electrical signal to the signal conditioner 64. As long as the internal size of the hose stays within the predetermined size limits the signal being transmitted from the pressure transducer 60 will stay within a predetermined range and the motor control 68 will continue to operate the motor 43 of the first extruder 22 at a given speed to produce the hose 10. Once the signal from the pressure transducer 60 falls outside of the predetermined range, as a result of a change of the internal size of the hose 10, the motor control 68 will change the speed of the motor 43 of the first extruder 22 thus adjusting the rate of extrusion of the material which changes the internal size of the hose 10. Consequently, the inside diameter of the hose 10 is maintained which ensures the proper size needed for securing the coupling to the hose.

If the electrical signal from the pressure transducer 60 falls to far outside the predetermined range of signal conditioner 64 directs an electrical signal to the marker actuator control 76 through the electrical line 78. In response to the electrical signal, the marker device 80 marks the outside portion of the hose 10 that is too far outside of the limits prescribed for the inside diameter. This allows removal of the defective portion.

The take-up mechanism 36 collects the hose 10 from the die mechanism 25 and maintains it on the take-up reel 90 for subsequent curing of the hose 10.

Thus, the method of manufacturing an elastomeric hose comprises the steps of extruding an elastomeric hose having a predetermined internal size, monitoring the internal size continuously, and controlling the rate of extrusion in response to a change to the internal size from a predetermined size range. The method further includes the steps of braiding a reinforcement member on a mandrel, progressively removing the braided member from the mandrel, and wherein the step of extruding the hose includes extruding a liner from a first extruder onto the reinforcement member as it is being removed from the mandrel and extruding a cover from a second extruder onto the reinforcement member at approximately the same axial location as the extrusion of the liner and adjacent the mandrel. The method also includes changing the speed of the first extruder in response to the internal size changing from the predetermined size range. An additional step includes marking a portion of the hose in response to a change in the internal size of the portion beyond a predetermined size range.

In view of the foregoing, it is readily apparent that the method and apparatus provides a continuous hose making process that maintains an accurate internal size without requiring the use of lengthy mandrels for extruding the hose onto. Furthermore, the process provides a manufacturing process that produces a reinforced hose on a continuous basis while maintaining the critical internal diameter without requiring large amounts of manufacturing floor space, thus reducing the overall cost of making the hose.

Other aspects, objects and advantages of this invention can be obtained from a study of the drawings, the disclosure and the appended claims.

I claim:

1. A method of manufacturing an elastomeric hose (10,26), comprising the steps of:
    extruding with internal and external shaping members an elastomeric hose (10,26) having a predetermined internal size as defined by an inner peripheral surface;
    defining an optimum orifice size between the inner peripheral surface of the extruded hose (10) and a fluid gauge means (54) located within the extruded hose (10) and forming an integral part of the internal shaping member;
    continuously monitoring the orifice size with the fluid gauge means (54); and
    controlling the rate of extrusion in response to a change in the orifice size from a predetermined size range.

2. The method, as set forth in claim 1, including the steps of braiding a reinforcement member (16) on a mandrel (48);
    progressively removing the braided member (16) from the mandrel (48); and
    wherein the step of extruding the hose (10) includes extruding a liner (26) from a first extruder (22) onto the reinforcement member (16) as it is being removed from the mandrel (48) and extruding a cover (28) from a second extruder (24) onto the reinforcement member (16) at approximately the same axial location of the extruding of the liner (26) and adjacent the mandrel (48).

3. The method, as set forth in claim 2, wherein the step of controlling the rate of extrusion includes changing the speed of the first extruder (22) in response to the orifice size changing from the predetermined size range.

4. The method, as set forth in claim 1, including the step of marking a portion of the hose (10,26) in response to the orifice size changing from the predetermined size range.

5. In an apparatus (12) for controlling the internal size of an extruded elastomeric member (10), said apparatus (12) including an extruder (22) and die mechanism (25) for continuously forming the extruded member, the die having internal and external shaping members (102,118), the improvement comprising:
    fluid gauge means (54) for continuously monitoring the internal size of the extruded member (10) as defined by an inner peripheral surface, the fluid gauge means (54) is located within the extruded member and forms an integral part of the internal shaping member (102), an optimum orifice size is defined between the fluid gauge means (54) and the inner peripheral surface of the extruded member (10); and
    control means (32) for controlling the speed of the extruder (22) in response to a change in the orifice size from a predetermined size range.

6. The apparatus (12), as set forth in claim 5, including an external source (56) of fluid pressure connected to said fluid gauge means (54).

7. The apparatus (12), as set forth in claim 6, wherein the internal shaping member (102) has a passage (116) located therein, one end of the passage (116) being connected to the external source (56) of fluid pressure and a gauging member (112) being secured to the internal shaping member (102) at the other end of the passage (116), said gauging member (112) having a cross-sectional area relative to the optimum cross-sectional area of the inside of the extruded member (10) to establish the optimum orifice, said orifice being in open communication with said passage (116).

8. The apparatus (12), as set forth in claim 7, wherein said external source (56) of fluid pressure is an air pump.

9. The apparatus (12), as set forth in claim 5, wherein the extruded elastomeric member (10) is a liner (26), and further including a braiding machine (14) adapted to continuously form a braided reinforcement member (16) for the liner (26).

10. The apparatus (12), as set forth in claim 9, including a second extruder (24) adapted to form an outside cover (28) on the braided member (16); forming of the extruded member (26), the reinforcing braid (16), and the outside cover (28) occurring at approximately the same location.

11. The apparatus (12), as set forth in claim 1, including means (34) for marking a defect in the extruded member (10) in response to the internal size changing from a predetermined size range.

12. The apparatus (12), as set forth in claim 11, wherein the marking means (34) includes a marker actuator control (76) connected to the fluid gauge means (54) and a marking device (80) connected to the apparatus (12) adapted to mark a portion of the outside surface of the extruded member (10) in response to the internal size changing from the predetermined size range.

13. The apparatus (12), as set forth in claim 12, wherein the marking device (80) includes a paint spray nozzle (84).

14. An apparatus (12) for forming a flexible reinforced hose (10), comprising:
a braiding machine (14) adapted to braid a tubular reinforcement member (16) for the flexible hose (10), said tubular member (16) having inner and outer surfaces (18,20);
a first extruder (22) adapted to form a liner (26) on the inner surface (18) of the tubular member (16), said liner (26) having an internal size as defined by an inner peripheral surface;
a second extruder (24) adapted to form a cover (28) on the outer surface (20) of the tubular member (16) at approximately the same location where the first extruder forms the liner;
means (30) for continuously monitoring the internal size of the liner (26) and establishing a signal proportional to the internal size; and
means (32) for controlling the speed of the first extruder (22) in response to said signal indicating a change of the internal size of the liner (26) from a predetermined size range, the speed control of the first extruder (22) being independent of the speed control of the second extruder (24) and the braiding machine (14) said monitoring means (30) includes a gauge means (54) for monitoring the internal size of the reinforced hose (10), the gauge means (54) being located within the extruder liner (26) adjacent the first extruder (22).

15. The apparatus as set forth in claim 14, wherein the gauge means is a fluid gauge.

16. The apparatus as set forth in claim 15, wherein the first extruder (26) includes an internal forming member (102) and said fluid gauge means (54) is integral with said internal forming member (102).

17. The apparatus as set forth in claim 16, wherein an optimum orifice size is defined between the fluid gauge means (54) and the inner peripheral surface of the liner (26).

18. The apparatus as set forth in claim 17, wherein said control means (32) responsive to a signal from the fluid gauge means (54) changes the speed of the first extruder (22) in response to a change in the orifice size from a predetermined size range.

* * * * *

UNITED STATES PATENT AND TRADEMARK OFFICE
CERTIFICATE OF CORRECTION

PATENT NO. : 4,490,316

DATED : December 25, 1984

INVENTOR(S) : Ronald L. Satzler

It is certified that error appears in the above-identified patent and that said Letters Patent is hereby corrected as shown below:

Column 7, line 7: delete "1" and insert --5--.

Signed and Sealed this

Seventh Day of May 1985

[SEAL]

Attest:

DONALD J. QUIGG

*Attesting Officer*  *Acting Commissioner of Patents and Trademarks*